(12) United States Patent
Silveri

(10) Patent No.: US 6,811,747 B2
(45) Date of Patent: Nov. 2, 2004

(54) CORROSION INHIBITOR

(75) Inventor: Michael A. Silveri, Incline Village, NV (US)

(73) Assignee: Bioquest, LLC, Berthound, CO (US)

( * ) Notice: Subject to any disclaimer, the term of this patent is extended or adjusted under 35 U.S.C. 154(b) by 0 days.

(21) Appl. No.: 10/455,642

(22) Filed: Jun. 4, 2003

(65) Prior Publication Data

US 2003/0231979 A1 Dec. 18, 2003

Related U.S. Application Data

(60) Provisional application No. 60/388,589, filed on Jun. 12, 2002.

(51) Int. Cl.[7] ........................... C23F 11/18; C23F 11/04
(52) U.S. Cl. ........................ 422/12; 422/14; 422/17; 422/18; 422/19; 252/387; 252/389.3; 252/389.54; 252/389.62
(58) Field of Search ............................. 422/12, 17, 18, 422/14, 19; 252/387, 389.3, 389.54, 389.62

(56) References Cited

U.S. PATENT DOCUMENTS 2,976,193 A * 3/1961 Pimbley ..................... 148/266
3,468,803 A * 9/1969 Knapp et al. ............... 510/224
5,066,408 A * 11/1991 Powell ....................... 210/765
6,646,082 B2 * 11/2003 Ghosh et al. ............... 526/262

FOREIGN PATENT DOCUMENTS

JP        53102237 A  *  9/1978

* cited by examiner

Primary Examiner—Elizabeth McKane
(74) Attorney, Agent, or Firm—Harry T. Stephenson

(57) ABSTRACT

The present invention relates to water treatment chemical formulations, and more particularly to chemical formulations used to treat water containing halogens as a sanitizing agent. The water treatment chemical formulations contain cyanuric acid and an alkali metal molybdate or silicate as an anticorrosion agent.

20 Claims, 17 Drawing Sheets

Flow injection manifold used for bromine determination.

CORROSION INHIBITOR

This application claims the benefit of provisional application 60/388,589 filed on Jun. 12, 2002.

FIELD OF THE INVENTION

The present invention relates to water treatment chemical formulations, and more particularly to chemical formulations used to treat water containing halogens as sanitizing agents. The water treatment chemical formulations contain cyanuric acid and an alkali metal molybdate or silicate as an anticorrosion agent.

BACKGROUND OF THE INVENTION

The corrosion of metal equipment is a widespread and expensive problem in many industrial settings such as open recirculating cooling towers and in the agricultural industry in fertilizer storage and irrigation systems, as well as in consumer settings such as swimming pools and spas. Expenses arise due to corrosion from costly repairs and replacement of metal equipment parts that have been weakened or destroyed by the action of water and oxygen at the metal surface.

Pitting corrosion is a localized form of corrosion by which cavities or holes are produced in a metal. Pitting is commonly observed on surfaces with little or no general corrosion. Pitting typically occurs as a process of local anodic dissolution where metal loss is exacerbated by the presence of a small anode and a large cathode. Pitting is often found in situations where resistance against general corrosion is conferred by passive surface films. Localized pitting attack is found where these passive films have broken down. Pitting corrosion is generally of greater concern than uniform corrosion because it is more difficult to detect and protect against. Corrosion products often cover the pits, making them difficult to identify. Apart from localized loss of thickness at the metal surface, corrosion pits can also be harmful by acting as stress risers. Corrosion pits are commonly the starting points for cracking and fatigue.

An extremely corrosive microenvironment typically forms within a corrosion pit that varies considerably from the bulk corrosive environment. For example, when stainless steels undergo electrochemical pitting processes in water containing chloride ions, a microenvironment having a high concentration of hydrochloric acid (and thus low pH) typically forms within the pits. This corrosive microenvironment can hasten growth of pits once initially formed.

Pitting corrosion can produce pits in a variety of configurations. For example, open pits may be formed, or pits may be covered with a semi-permeable skin comprising corrosion products. Pits can be hemispherical or cup-shaped, flat-walled, or completely irregular in shape. Pits may also reveal the crystal structure of the metal. Trough-shaped pits may be narrow and deep or shallow and wide. Sideways pits may be subsurface, undercutting, or attack the grain of the metal horizontally.

Pitting is quantified in various ways. The pitting factor is the ratio of the depth of the deepest corrosion pit divided by the average penetration as calculated from weight loss. The Pitting Resistance Equivalent Number (PREN) is an empirical relationship used to predict the pitting resistance of austenitic and duplex stainless steels, and is defined by the equation PREN=Cr+3.3(Mo+0.5 W)+16N.

The extent of pitting corrosion can vary greatly depending on the exposure conditions and surface condition of the material. Commonly used methods to determine the pitting corrosion resistance include ASTM G (standard reference test method for making poteniostatic and potentiodynamic anodic polarization measurements), ASTM G-46 (practice for examination and evaluation of pitting corrosion), ASTM G-48 (test methods for pitting and crevice corrosion resistance of stainless steels and related alloys by the use of ferric chloride solution), ASTM G-61 (cyclic potentiodynamic polarization measurements for localized corrosion susceptibility of iron, nickel or cobalt based alloys), ASTM G-85 (modified salt spray testing), and NACE TM0274 (dynamic corrosion testing of metals in high temperature water).

Visual examination and metallographic techniques are particularly useful in characterizing the physical nature of the localized corrosive attack. The most relevant information is generally the maximum attack depth or rate since these parameters will most directly indicate the serviceability of the metal component.

Methods of preventing or retarding pitting include, amongst others, increasing the velocity at which the liquid in contact with the exposed metal moves across the metal surface; removing scale and other solids deposits from the metal surface; employing ferritic metal alloys with higher alloy content (for example, chromium, molybdenum, and nitrogen), expressed as a higher PREN number; use of titanium or zirconium alloys; dearating the environment at the exposed metal surface; reducing the temperature of the system; employing inert or purge gasses in the system; maintaining the system in an alkaline state (pH>7); and employing corrosion inhibitors to enhance resistance of the metal to corrosion pitting.

Of the above-mentioned methods for preventing or retarding pitting corrosion, the use of corrosion inhibitors as additives to aqueous systems in contact with exposed metal surfaces is widely used. Corrosion inhibitors typically inhibit the rate of corrosion at a metal surface by forming a passivation layer on the metal surface, namely, a surface film that physically blocks the diffusion of ions to and from the surface of the metal. Such passivation films may be produced by deposition of the corrosion inhibitor on the metal surface, or by reaction of the corrosion inhibitor with the metal surface. Other corrosion inhibitors act by neutralizing corrosion-causing components present in the aqueous system.

SUMMARY OF THE INVENTION

A corrosion inhibitor system capable of preventing or retarding pitting corrosion while providing satisfactory performance in other aspects of water treatment is highly desirable. Corrosion inhibitor systems, wherein the systems are provided that incorporate a combination of cyanuric acid and either a silicate, a molybdate, or both a silicate and molybdate. This combination of components provides superior protection against pitting corrosion in ferritic metals.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENT

Figure 1:
FIG. 1 is a photograph showing corrosion to a coupon after completion of immersion Test A.
Figure 2:
FIG. 2 is a photograph showing corrosion to a coupon after completion of immersion Test B.
Figure 3:
FIG. 3 is a photograph showing corrosion to a coupon after completion of immersion Test C.
Figure 4:
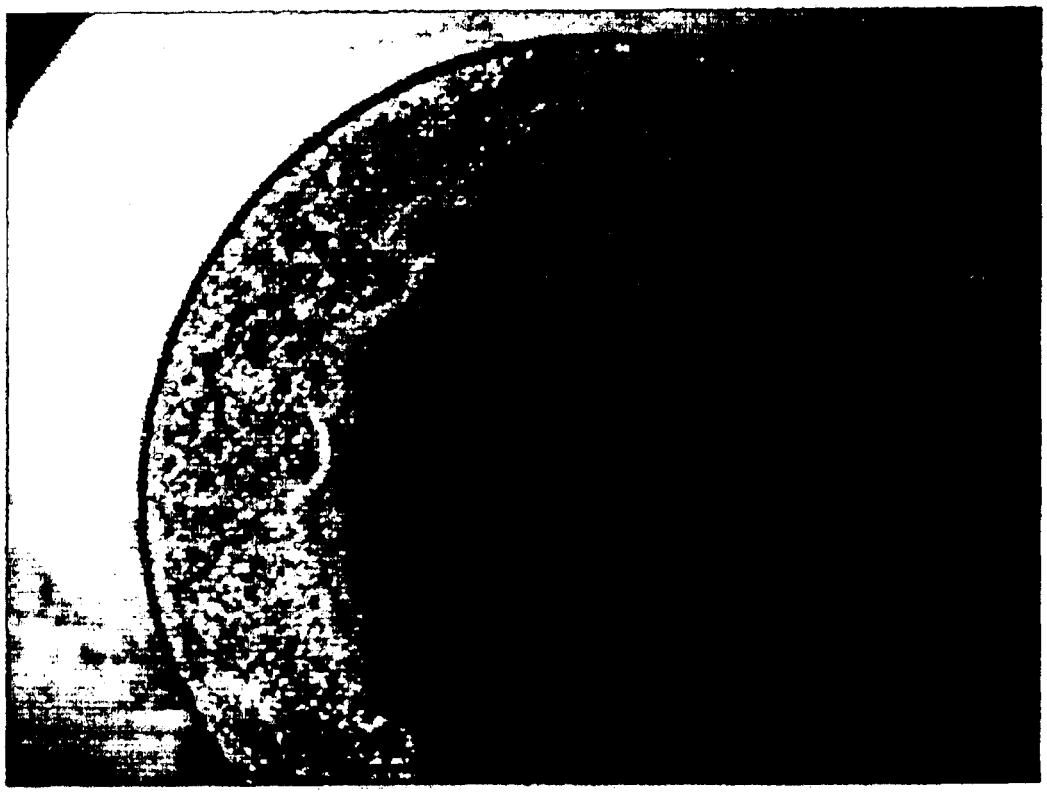
FIG. 4 is a photograph showing corrosion to a coupon after completion of immersion Test D.
Figure 5:
FIG. 5 is a photograph showing corrosion to a coupon after completion of immersion Test E.
Figure 6:
FIG. 6 is a photograph showing corrosion to a coupon after completion of immersion Test F.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

Water features such as swimming pools, spas, water tanks, and cooling systems must be treated to prevent the growth of disease-bearing microorganisms such as *Pseudomonas aeruginosa*. Chlorine is the most popular biocide used to sanitize such water features. Chlorine may be added to the water of a water feature as a liquid or in a granular form, such as sodium dichloroisocyanurate. Electrolytic cells have been used to create the sanitizing form of chlorine from a chloride salt (such as NaCl) by electrolysis. The use of chlorine as a sanitizing agent has drawbacks, including a strong odor near the water feature from outgassed chlorine, eye and skin irritation to persons contacting the water of the chlorinated water feature, bleaching of hair and clothing, and corrosion of metal components in contact with the chlorinated water, such as spa heaters. Another biocide used to sanitize water features is bromine. Bromine, like chlorine, may be added to the water of a water feature as a liquid or in a granular form, and may also be generated from a bromide salt (such as NaBr) through electrolysis. The use of bromine causes less odor, less eye and skin irritation, less bleaching, and less corrosion of metal components than chlorine.

When chloride and/or bromide salts are added to water, steel parts exposed to the water may be susceptible to corrosion processes, especially those processes resulting in pitting corrosion. A corrosion inhibiting formulation is provided that minimizes corrosion when halogen salts are used in electrolytic sanitizing systems, thereby permitting sufficient salt to be added to the water to enable efficient electrolysis without increasing corrosion, especially pitting corrosion, of metal components exposed to the treated water.

The corrosion inhibiting formulations of preferred embodiments may offer a number of potential advantages compared to formulations of the prior art. The formulations may enable one to add sufficient salt to the water without increasing the risks of pitting corrosion, and may enable satisfactory corrosion results to be obtained without requiring upgrades of existing metals in a hot tub or spa.

The formulations do not present a health risk or hazards to bathers as determined by the EPA inerts list, unlike nitrate- or nitrite-containing formulations. The formulations also impart no color or offensive odors, nor do they interfere with the operation of an electrolytic cell through the deposition of deposits, or with the efficacy of bromine or chlorine in recreational water application.

The formulations may avoid certain drawbacks associated with formulations containing high levels of silicate and sulfate, namely, a corresponding high level of precipitated calcium silicate or sulfate salts, respectively. The formulations may also avoid certain drawbacks associated with low levels of phosphate, for example, the formation of calcium phosphate precipitate on electrolytic cells or a finely divided calcium phosphate precipitate that clouds the water.

Excessive foaming is not observed for the formulations of preferred embodiments, which also do not create a sanitizer demand, and are stable for up to about 6 to 12 months or more. The long stability is in contrast to many organic inhibitors, which typically do not last as long.

The formulations are low in cost, and specifically retard or prevent pitting corrosion on stainless steel 303, 304, and 316 alloys, in contrast to many inhibitors which are formulated for general corrosion inhibition and not specifically for pitting corrosion inhibition. They are also effective at the higher water temperatures typically found in spas, namely, up to about 80° F. (26.7° C.) to 105° F. (40.5° C.) or more.

The formulations do not supply nutrients for micro organisms, unlike formulations containing inhibitors such as sodium benzoate, and does not discolor decorative metals, as is observed for certain formulations containing high molybdate levels.

The Corrosion Inhibiting Formulations

While many commercially available corrosion inhibitor components have been used either by themselves or in combination, the particular combinations of the preferred embodiments produce dramatic results in retarding corrosion, particularly pitting corrosion.

In preferred embodiments, a pitting corrosion inhibiting formulation is provided for the treatment of water that contains halogen salts, for example, water sanitized by bromine or chlorine generated through electrolysis of the corresponding salt. The water treatment formulations are particularly preferred for use in conjunction with electrolysis sanitizing systems employing electrolysis of sodium bromide.

In preferred embodiments, the formulations include a synergistic corrosion inhibiting combination of cyanuric acid and a molybdate and/or a silicate. The bromide or chloride salt is preferably sodium bromide or sodium chloride, respectively. Preferred molybdates and silicates include the corresponding sodium salts. The formulation typically includes sodium carbonate as a buffering additive. In other embodiments, various other water treatment agents may be present as well. These may include, but are not limited to, acrylate polymers, phosphonobutane-1,2,4-tricarboxylic acid, 5,5-dimethylhydantoin, 1-bromo-3-chloro-5,5-dimethylhydantoin, sodium hexametaphosphate, and phosphonate. The components of the preferred formulations are discussed in detail below.

Cyanuric Acid

When used as sanitizing agents, chlorine and bromine are both depleted from treated water over time. The rate of loss generally depends upon, among other things, the water temperature, the exposure to sunlight (or other sources of ultraviolet light), and the bacteria load in the water feature. In chlorine systems, cyanuric acid ($H_3(NCO)_3$) is often used as a "chlorine stabilizer" to slow the depletion of chlorine. In 1995, National Spa & Pool Institute (NSPI) guidelines recommended maintaining cyanuric acid levels in chlorinated outdoor pools between 30–50 parts per million (ppm) to offset the loss of chlorine.

Cyanuric acid is also effective at stabilizing bromine. The mechanism by which the cyanuric acid stabilizes bromine is not fully understood, although it is likely that the cyanuric acid "binds" a portion of the bromine present in the water of the water feature, thus lowering the vapor pressure of the bromine. This bound bromine is less susceptible to thermal loss and ultraviolet loss than is unbound bromine. Conventional wisdom in the spa and pool industry at one time held that cyanuric acid should not be used with bromine because, rather than stabilizing the bromine, the cyanuric acid was believed to remove bromine from the system. The removal of bromine, however, only occurs for an initial "bromine demand" resulting from bromine removal by impurities in the cyanuric acid. Once that initial demand is overcome, the cyanuric acid behaves as a bromine stabilizer as discussed above. Thus, when the chemical formulation is used with a water feature sanitized by electrolysis of a bromide salt, an initial "start up" dose of bromine is typically added to satisfy the initial bromine demand of the cyanuric acid.

Cyanuric acid may also be employed as a buffering agent. Although the buffering properties of cyanuric acid are known (pKa=6.8), cyanuric acid is typically not utilized in buffers for chlorinated water features because cyanuric acid concentrations must be kept relatively low to avoid "chlorine lock"—a condition wherein the sanitizing strength of chlorine drops sharply. NSPI standards consider a cyanuric acid concentration of 30 to 50 ppm to be ideal for chlorinated swimming pools, and state health regulations often set a maximum cyanuric acid concentration for public swimming pools at 100 ppm. At such low concentrations, cyanuric acid does not provide substantial buffering. In contrast to chlorine, when bromine is employed as a sanitizing agent, an equivalent "bromine lock" condition is not observed.

The cyanuric acid may be used in combination with another buffering agent, for example, sodium carbonate. When added to a water feature at the preferred concentrations, the cyanuric acid/sodium carbonate pair acts as buffer that maintains the pH of the water feature near about 7 (with maximum buffering at a pH of about 7.1). At a concentration of about 200 ppm (preferred when bromine is used as the sanitizing agent) and at a pH of about 7.0, cyanuric acid has a buffer capacity of about $8.5 \times 10^{-4}$. At a concentration of about 600 ppm (preferred when bromine is used as the sanitizing agent) and at a pH of about 7.0, cyanuric acid has a buffer capacity of about $2.6 \times 10^{-3}$. By contrast, the buffer capacity is an order of magnitude lower at the low concentrations ($\leq 100$ ppm) of cyanuric acid that are specified for chlorine-based sanitation systems.

The cyanuric acid buffer enables the pH level in the water of the water feature to be maintained within acceptable limits much more easily than in the absence of the buffer. Depending upon the relative concentrations of the acid and base, the buffer will inhibit shifts in pH from levels near 7, that is, between approximately 6.5 and 7.5. The strength of the buffer is at a maximum at about 6.8. Thus, home spa owners may only need to adjust the pH levels of spas using cyanuric acid as a buffer only approximately every two months.

Although a preferred buffer includes cyanuric acid in combination with sodium carbonate, the cyanuric acid may be used as the sole buffer, or in combination with other compounds as are known in the art for their suitability for use as buffers. The buffers of preferred embodiments may be produced using sodium cyanurate as a base, together with any number of acids.

Cyanuric acid is typically added to the water feature at a level such that a synergistic effect on corrosion inhibition, especially pitting corrosion inhibition is observed. It is generally preferred to add cyanuric acid to the water of the water feature so as to provide a concentration of from about 50 ppm or less to about 600 ppm or more, preferably from about 150 ppm to about 450 ppm, and most preferably from about 250 ppm to about 350 ppm. In certain embodiments it may be preferred to have a higher or lower concentration of cyanuric acid, however. The cyanuric acid may be added to the water feature in any suitable form, including, but not limited to isocyanurate and mono-, di-, and trisodium salts of cyanuric acid]. When one or more additional buffers are present, it may be preferred to reduce the amount of cyanuric acid. However, in many embodiments the above-mentioned concentrations are most preferred.

Alkali Metal Molybdate and Silicates

Molybdates function as anodic inhibitors. Namely, they passivate anodic surfaces against corrosion. Molybdates exhibit a strong inhibiting effect towards corrosion by chloride and sulfate ions. Molybdates also serve to retard pitting corrosion, even to the extent of repassivating corrosion pits. The mechanism by which such repassivation occurs is believed to involve the accumulation of molybdate ion in anodic pits wherein chloride or sulfate ions concentrate and pH is lowered. At the isoelectric point of molybdic acid (about pH 1.3), the molybdic acid precipitates, thus this mechanism may play a role in repassivation of anodic pits, which tend to have a pH of about 6.5 down to about 2 or less.

Molybdates are typically most effective at a pH of from about 6.5 to about 10, and are stable at high temperatures, namely, 150° C. or more. They have been reported to exhibit a synergistic effect on corrosion of steel when present in combination with phosphonobutane-1,2,4-tricarboxylic acid, as well as when present in combination with certain triazoles, for example, tolyltriazole and benzotriazole. It is believed that such synergists form loose bonds with molybdate, thus when the synergist adsorbs onto the metal surface, it holds the molybdate at the water-molybdate interface where it may immediately react with any anodic sites that develop. See *Garnaud*, et al. "20 Minutes with Molybdate—A Review of its Corrosion Inhibiting Properties," CTI Journal, Vol. 18, No. 2.

Silicates are observed to inhibit corrosion of ferrous surfaces. It is believed that the mechanism involved in corrosion inhibition involves the formation of Fe(II) silicate onto the exposed metal surface to form a passivation layer.

The silicate or molybdate is typically added to the water feature at a level such that in the presence of cyanuric acid, a synergistic effect on corrosion inhibition, especially pitting corrosion inhibition, is observed. It is generally preferred to add silicate to the water of the water feature so as to provide a concentration of from about 5 ppm or less to about 50 ppm or more, preferably from about 8 ppm to about 30 ppm, and most preferably from about 10 ppm to about 15 ppm. In certain embodiments it may be preferred to have a higher or lower concentration of silicate, however. It is generally preferred to add molybdate to the water of the water feature so as to provide a concentration of from about 3 ppm to about 50 ppm, preferably from about 25 ppm to about 45 ppm, and most preferably from about 30 ppm to about 40 ppm. In certain embodiments it may be preferred to have a higher or lower concentration of molybdate, however.

In certain embodiments, it may be preferred to employ a combination of silicate and molybdate. When a combination of silicate and molybdate is employed, it may be desirable to use less of each component than would be used if only one or the other was present. However, for many embodiments wherein silicate and molybdate are both present, the above concentrations are most preferred. In other embodiments, it may be preferred to use only one of the silicate or the molybdate. In those embodiments, it may be preferred to adjust the concentration of the silicate or molybdate above the concentrations listed above. However, the above concentrations are generally most preferred.

The silicate and/or molybdate may be added to the water feature in any suitable form, most preferably in the form of a soluble salt, for example, an alkali metal salt. Particularly preferred are the sodium salts.

Sodium Bromide

As mentioned above, water features are often treated to prevent the growth of disease-bearing microorganisms. Chlorine or bromine may be added to the water of a water feature as a liquid or through a granular form, such as sodium dichloroisocyanurate, or may be generated from the halogen salt by electrolysis. A particularly preferred biocide for the sanitization of water features is bromine generated through electrolysis.

The chloride or bromide salt from which the corresponding halogen is electrolytically generated is typically added to the water feature at a level such that satisfactory sanitization or disinfection is provided. It is generally preferred to add chloride salt to the water of the water feature so as to provide a concentration of from about 300 ppm (as NaCl) or less to about 3000 ppm or more, preferably from about 450 ppm to about 2000 ppm, and most preferably from about 600 ppm to about 1000 ppm. In certain embodiments it may be preferred to have a higher or lower concentration of chloride salt, however.

It is generally preferred to add bromide salt to the water of the water feature so as to provide a concentration of from about 300 ppm (as NaBr) or less to about 2,000 ppm or more, preferably from about 600 ppm to about 1,500 ppm, and most preferably from about 750 ppm to about 1,250 ppm. In certain embodiments it may be preferred to have a higher or lower concentration of bromide salt, however.

The chloride or bromide salt may be added to the water feature in the form of a soluble salt. Particularly preferred are the sodium salts, especially sodium bromide.

Sodium Carbonate

As discussed above, in certain embodiments it is preferred to use as a buffer a combination of sodium carbonate and cyanuric acid. This combination may be added to water to as a buffering agent to provide a stable pH of about 6.5 to about 8, the pH level at which many corrosion inhibitors operate most effectively.

The concentration of the sodium carbonate is selected so as to provide satisfactory buffering of the treated water to a pH of about 6.5 to about 8. Such a pH level is typically achieved by adding sodium carbonate to the water of the water feature at a concentration of from about 50 ppm or less to about 300 ppm or more, preferably from about 100 ppm to about 200 ppm, and most preferably from about 140 ppm to about 160 ppm. The optimum concentration, however, may vary, depending on a variety of factors such as the nature of the water to be treated and the other water treatment chemicals present in the formulation. Therefore, in certain embodiments it may be preferred to have a higher or lower concentration of sodium carbonate than specified above.

While sodium carbonate is generally preferred as a buffer, other buffers as are known in the art may also be used with satisfactory results. A single buffer or combination of buffers may also be advantageously employed.

Polyacrylate Homopolymer

Polymers, such as polyacrylate homopolymers, copolymers, and terpolymers generally function as dispersants in water. They disperse and/or solubilize materials prone to precipitation so as to prevent fouling. Lower molecular weight polyacrylates may inhibit precipitation of materials from solution by inhibiting crystal growth, while higher molecular weigh polyacrylates may prevent deposition of precipitated materials once formed.

Sufficient polyacrylate is typically added so as to provide satisfactory dispersancy of any particulates present in the water. It is generally preferred to add polyacrylate to the water of the water feature so as to provide a concentration of from about 5 ppm or less to about 30 ppm or more, preferably from about 10 ppm to about 22 ppm, and most preferably from about 18 ppm to about 20 ppm. In certain embodiments it may be preferred to have a higher or lower concentration of polyacrylate, however. While acrylate polymers are generally preferred, any suitable dispersant, either polymeric or non-polymeric, may also be employed. A single dispersant or combination of dispersants may also be advantageously employed.

2-Phosphonobutane-1,2,4-Tricarboxylic Acid

Corrosion inhibition of ferrous metals, such as stainless steel, by 2-phosphonobutane-1,2,4-tricarboxylic acid (PBTA) involves the formation of a passivation layer on the exposed metal surface. The passivation layer consists mainly of oxygen, carbon, calcium, iron, and phosphorous, and serves to separate the metal surface from electrolytes in the contacting liquid. The passivation film may have a thickness of less than about 10 nm. Another property of PBTA is its ability to stabilize carbonate hardness, thereby substantially preventing calcium carbonate precipitation. The mechanism by which calcium carbonate hardness is stabilized may involve the adsorption of PBTA onto growth sites of calcium carbonate crystallites, thereby retarding or preventing crystallite growth.

The presence of carbonate ions and Fe(III) ions (a secondary corrosion product of iron) reduce the solubility of the dicalcium salt of PBTA, thereby contributing to the growth of the passivation layer. Thus, a corrosion product plays a role in the formation of the passivation layer. As the film grows and protects the exposed metal surface, the concentration of Fe(II) ion in solution is decreased, which decreases the rate of growth of the passivation layer until it finally inhibits corrosion, and also the continued growth of the passivation layer.

Studies suggest that PBTA alone at high concentration provides an improved corrosion inhibiting effect by influencing the structure of Fe(II)-oxide hydrate films. The passivation layer growth rate is observed to be 10 times greater for PBTA alone than PBTA in the presence of zinc or calcium ions. Only a small amount of phosphonate is incorporated into the film, typically 1 part phosphorous to 20 parts iron after 5 days exposure to treated water. See Ashcraft, et al., "The Mechanism of Corrosion Inhibition and Transition to Underdeposit Corrosion", Paper No. 328, Corrosion 87, Mar. 9–13, 1987, San Francisco, Calif.; and *Ashcraft*, et al., "The Influence of Typical Cooling Water Parameters on the Corrosion Inhibiting Effect of 2-Phosphonobutane-1,2,4-Tricarboxylic Acid (PBTA)", Paper No. 401, Corrosion 86, Mar. 17–21, 1986, Houston, Tex.

Sufficient PBTA is typically added so as to provide satisfactory corrosion inhibition when present in combination with the other corrosion inhibiting components present in the formulations of preferred embodiments. It is generally preferred to add PBTA to the water of the water feature so as to provide a concentration of from about 3 ppm or less to about 20 ppm or more, preferably from about 8 ppm to about 15 ppm, and most preferably from about 10 ppm to about 12 ppm. In certain embodiments it may be preferred to have a higher or lower concentration of PBTA, however.

5,5-Dimethylhydantoin 5,5-dimethylhydantoin (DMH), when added to a water feature containing bromine, inhibits the formation of bromate. DMH may be added directly to the water feature to be treated, or may be generated in situ from 1-bromo-3-chloro-5,5-dimethylhydantoin (BCDMH). BCDMH is typically added to water features as a disinfectant. When dissolved in water, hypobromous acid and hypochlorous acid are generated. Both hypobromous acid and hypochlorous acid are effective as disinfectants. However, the hypobromous acid, in reactions that may include the hypochlorous acid, is converted to hypobromite ion, which is the predominate disinfectant generated by BCDMH.

DMH, when present, is typically added so as to provide satisfactory inhibition of bromate formation when present in combination with the other components in the formulation, including a bromine source, while not having a detrimental effect on corrosion performance. It is generally preferred to add DMH to the water of the water feature so as to provide a concentration of from about 10 ppm or less to about 100 ppm or more, preferably from about 20 ppm to about 70 ppm, and most preferably from about 40 ppm to about 50 ppm. In certain embodiments it may be preferred to have a higher or lower concentration of DMH, however.

Sodium Hexametaphosphate

Sodium hexametaphosphate is typically added to water to increase the solubility of certain ions and to deter the precipitation of certain chemicals. For example, it is used to prevent calcium from precipitating out of water. It also forms a thin passivation layer that protects exposed metal surfaces from corrosion.

Sodium hexametaphosphate, when present, is typically added so as to provide satisfactory dispersancy and corrosion protection when used in combination with the other components of the formulation. It is generally preferred to add sodium hexametaphosphate to the water of the water feature so as to provide a concentration of from about 3 ppm or less to about 50 ppm or more, preferably from about 5 ppm to about 10 ppm, and most preferably from about 7 ppm to about 8 ppm. In certain embodiments it may be preferred to have a higher or lower concentration of sodium hexametaphosphate, however.

Phosphonate

Phosphonate is typically added to water as a scale inhibitor. Certain phosphonates may also synergize certain corrosion inhibitors, thereby improving their performance. Phosphonate, when present, is typically added so as to provide satisfactory scale inhibition and corrosion inhibition when used in combination with the other components of the formulation. It is generally preferred to add phosphonate to the water of the water feature so as to provide a concentration of from about 3 ppm or less to about 20 ppm or more, preferably from about 5 ppm to about 15 ppm, and most preferably from about 8 ppm to about 10 ppm. In certain embodiments it may be preferred to have a higher or lower concentration of phosphonate, however.

Preferred Formulations

Particularly preferred formulations typically include a bromide or chloride salt together with a synergistic combination of cyanuric acid and a silicate and/or a molybdate. In a particularly preferred embodiment, the bromide salt is sodium bromide. The weight ratio of sodium bromide to cyanuric acid is typically from about 40 or more:1 to 1 or less:1, preferably from about 10:1 to 2:1, and most preferably from about 4:1 to 3:1. In certain embodiments, however, higher or lower ratios may be preferred.

The ratio of cyanuric acid to silicate or molybdate in the formulations is typically from about 120 or more:1 to 1 or less:1, preferably from about 60:1 to 10:1, and most preferably from about 40:1 to 20:1. In certain embodiments, however, higher or lower ratios may be preferred.

In a particularly preferred embodiment, a corrosion inhibiting formulation is provided that, when added to a water feature, yields water treated to the following additive levels: sodium bromide at a level of about 300 ppm (as NaBr) to about 2,000 ppm, preferably about 600 ppm to about 1,500 ppm, and most preferably about 1000 ppm; sodium silicate at a level of from about 5 ppm (as $SiO_2$) to about 50 ppm, preferably from about 8 ppm to about 30 ppm, and most preferably about 11 ppm; sodium molybdate at a level of from about 3 ppm (as $MoO_4^{2-}$) to about 50 ppm, more preferably from about 10 ppm to about 40 ppm, and most preferably about 27 ppm; cyanuric acid at a level from about 50 ppm to about 600 ppm, more preferably from about 150 to about 450 ppm, and most preferably about 300 preferred; and sufficient sodium carbonate to yield a pH of about 6.5 to about 8. The formulation may additionally contain a polyacrylate and/or 2-phosphonobutane-1,2,4-tricarboxylic acid.

A description of a particularly preferred formulation is provided in Table 1.

TABLE 1

| Chemical | Weight % | Active Component Formula | Active Component (%) | Spa Concentration [1] (mg/L) |
|---|---|---|---|---|
| NaBr | 47.8 | NaBr | 100 | 900 |
| $Na_2MoO_4 \cdot 2H_2O$ | 2.2 | $MoO_4^{2-}$ | 66.1 | 27 |
| 5,5,Dinethylhydantoin | 2.7 | DMH | 97.0 | 50 |
| $Na_2SiO_3 \cdot 5H_2O$ | 2.3 | $SiO_2$ | 28.3 | 12 |

TABLE 1-continued

| Chemical | Weight % | Active Component Formula | Active Component (%) | Spa Concentration [1] (mg/L) |
|---|---|---|---|---|
| ICA | 33.9 | ICA | 94 | 600 |
| $Na_2CO_3$ | 8.9 | $Na_2CO_3$ | 100 | 168 |
| BF-K797 | 1.1 | BF-K797 | 100 | 20 |
| BF-K759 | 1.1 | BF-K759 | 100 | 20 |

EXAMPLES

A series of corrosion immersion tests were performed using coupons made from stainless steel heating elements and stainless steel bulkheads. The heating elements were brazed using a composite that contained silver, copper, nickel, and zinc. The corrosion immersion tests were conducted by immersing the coupons in water treated with different water treatment additive formulations.

The waters to which the water treatment additive formulations were added included water from the Reno municipal water supply and water from Kings Beach, Calif. Control test A was conducted in Reno, Nev. tap water to which $Br_2$ was added as the bromine-water stock solution and controlled at 4.0 ppm $Br_2$ level. The BCDMH control contained the same tap water to which 1-bromo-3-chloro-5,5-dimethylhydantoin was periodically added to control halogen level at 4.0 ppm expressed as $Br_2$. Sodium dichloro-s-triazinetrione (sodium dichloroisocyanurate, DICHLOR) was periodically added to control test K to control the chlorine level. This test solution also contained 1100 ppm NaCl. Bromine was added to the solutions tested using a dilute bromine-water stock solution. The stock solution was standardized using the phenylarsineoxide titration Method 4500-Cl D. See *Standard Methods for the Examination of Water and Waste Water*, 19th Edition, A. D. Eaton, L. S. Clesceri, and A. E. Greenberg, Eds., American Public Health Association, Washington, D.C., 1995, pp 4-41–4-43. For the BCDMH control test, a predetermined weight of 1-bromo-3-chloro-5,5-dimethylhydantoin was added to the test solution to yield a predetermined bromine level. For the DICHLOR control test, a predetermined weight of sodium dichloroisocyanurate was added to yield a predetermined chlorine level.

Figure 17:
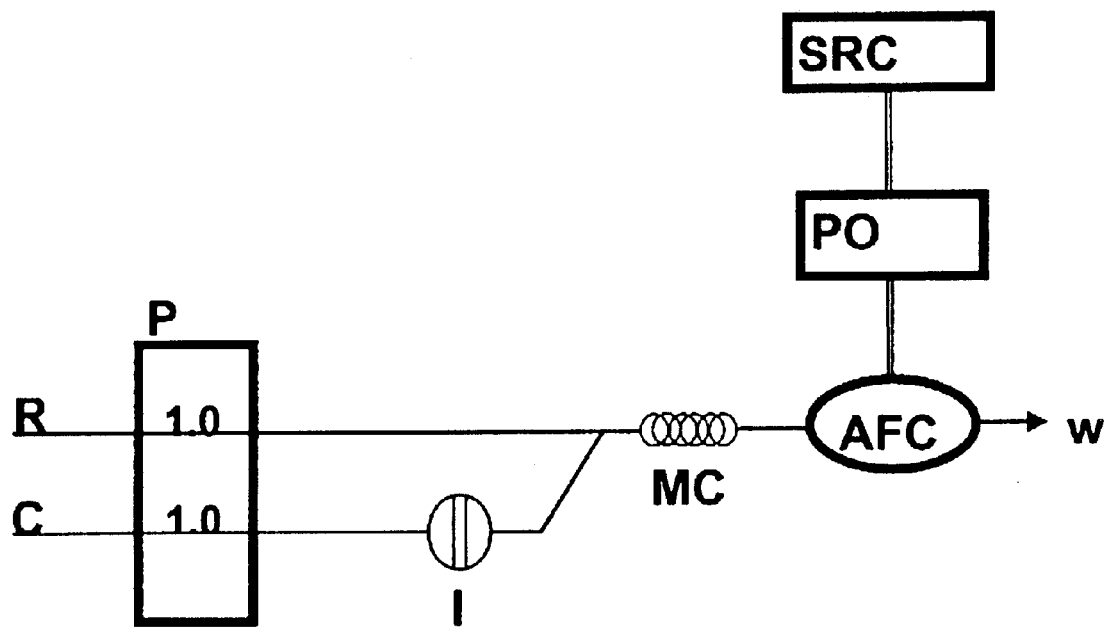
FIG. 17 is a schematic diagram of the apparatus employed in the flow injection test for bromine levels.

For periodical monitoring of the test solution bromine levels, a flow injection (FI) method was developed that utilized 1 ml or less of the test solution; The small sample volume is desirable for a long immersion corrosion test because analytical methods that require larger sample sizes (e.g., titration methods) are not practical due to the resulting rapid depletion of the test solution. The FI method used for bromine determination is depicted in FIG. 17. In FIG. 17, C refers to the carrier (nano-pure $H_2O$; R>18Ω-cm); R refers to the reagent (50×diluted acetate buffer for PAO titration); P refers to the peristaltic pump (flow rates are in ml/min); I refers to the injection valve (sample loop 100 µL); MC refers to the mixing coil (60 cm×0.5 mm i.d.); AFC refers to the amperometric flow through cell (BAS: dual Pt-working electrode in parallel configuration; Ag/AgCl reference electrode); PO refers to the potentiostat; SRC refers to the strip-chart recorder; and w refers to the flow to waste. Experimental parameters for the test are summarized in Table 2.

TABLE 2

| Parameter | Value | Comments |
|---|---|---|
| Applied potential ($E_{app}$) | 0.30 V vs. Ag/AgCl | More reducing potentials may result in a noisy baseline |
| Sensitivity | 1 µA/V | Cypress (OMNI 90) Potentiostat |
| Chart speed | 1 cm/min | — |
| Pen | 1 V/full scale | — |
| Flow (carrier) | 1.0 ml/min (white/white) | Nano-pure water (The resistance of this RO purified water was greater than 18 MΩ-cm. In addition this water had no halogen demand.) |
| Flow (buffer reagent) | 1.0 ml/min (white/white) | 20 ml buffer for PAO titration to 1.0 L nano-pure water |
| Injection volume | 100 µL | — |
| Sample throughput | 60 analyses/hour | — |
| Mixing coil | 60 cm × 0.5 mm i.d. | — |
| Pump setting | 20 | Ismatec REGLO |

Within an hour after the bromine measurement, if necessary, a predetermined volume of bromine stock solution was added to achieve bromine concentration of 4.0 ppm. In order to avoid significant changes in the test solution volume, the concentration of bromine stock solution used was high (~3000 ppm). Hence, an Eppendorf Research Pro automated electronic pipette was used for accurate 50–1000 µL volume deliveries of the stock solution. For example, the precisions at 100 and 1000 µL are better than 0.6% and 0.2%, respectively. The volume of bromine stock solution to be added may be calculated according to the following equation:

$$V_{STOCK} = \frac{900 \times (4.0 - C_{found})}{C_{STOCK}}$$

wherein $V_{STOCK}$ is the volume (expressed in ml) of the bromine-water stock solution of concentration $C_{STOCK}$ (expressed in mg/L or ppm) needed to raise the concentration of bromine in a particular test to 4.0 ppm. $C_{found}$ is the concentration of bromine found in a particular test solution using the previously described FI method.

The waters were treated with water treatment formulations containing various combinations of corrosion inhibitors and other water treatment chemicals. The concentrations of the components of the water treatment formulations tested are provided in Table 3.

TABLE 3

| Test | NaBr | NaCl | CYA | Na$_2$CO$_3$ | TP | PA | DMH | SiO$_2$ | MoO$_4^{2-}$ | PO$_4^{3-}$ | PBTA | Phosph. | pH | Water | Oxidant |
|---|---|---|---|---|---|---|---|---|---|---|---|---|---|---|---|
| A | 0 | 0 | 0 | 0 | 0 | 0 | 0 | 0 | 0 | 0 | 0 | 0 | 7.6 | Reno | Br$_2$ |
| B | 750 | 0 | 600 | 150 | 20 | 20 | 50 | 0 | 0 | 0 | 0 | 0 | 7.0 | Kings Beach | Br$_2$ |
| C | 750 | 0 | 600 | 150 | 20 | 20 | 50 | 0 | 0 | 0 | 0 | 0 | 7.0 | Reno | Br$_2$ |
| D | 750 | 0 | 600 | 150 | 20 | 20 | 50 | 50 | 30 | 15 | 0 | 0 | 7.0 | Reno | Br$_2$ |
| E | 750 | 0 | 600 | 150 | 20 | 20 | 50 | 12 | 30 | 15 | 0 | 0 | 7.0 | Reno | Br$_2$ |
| F | 750 | 0 | 600 | 150 | 20 | 20 | 50 | 50 | 30 | 0 | 0 | 0 | 7.0 | Reno | Br$_2$ |
| G | 750 | 0 | 600 | 150 | 20 | 20 | 50 | 50 | 0 | 0 | 10 | 0 | 7.0 | Reno | Br$_2$ |
| H | 750 | 0 | 600 | 150 | 20 | 20 | 50 | 50 | 30 | 0 | 10 | 0 | 7.0 | Reno | Br$_2$ |
| I | 750 | 0 | 600 | 150 | 20 | 20 | 50 | 50 | 30 | 15 | 10 | 0 | 7.0 | Reno | Br$_2$ |
| J | 750 | 0 | 600 | 150 | 20 | 20 | 50 | 12 | 30 | 15 | 0 | 0 | 7.0 | Reno | Br$_2$ |
| K | 0 | 1100 | 100 | 20 | 20 | 20 | 0 | 50 | 30 | 0 | 0 | 0 | 7.6 | Reno | DI-CHLOR |
| L | 1100 | 0 | 300 | 75 | 20 | 20 | 50 | 50 | 30 | 0 | 0 | 0 | 7.0 | Reno | Br$_2$ |
| M | 1100 | 0 | 0 | 0 | 20 | 20 | 0 | 0 | 0 | 0 | 0 | 0 | 7.6 | Reno | 8r2 |
| N | 750 | 0 | 0 | 0 | 20 | 20 | 0 | 0 | 0 | 0 | 0 | 0 | 7.6 | Reno | Br$_2$ |
| O | 750 | 0 | 600 | 150 | 20 | 20 | 0 | 0 | 0 | 0 | 0 | 0 | 7.0 | Reno | Br$_2$ |
| P | 750 | 0 | 600 | 150 | 20 | 20 | 50 | 12 | 30 | 0 | 0 | 20 | 7.0 | Reno | Br$_2$ |
| Control | 0 | 0 | 0 | 0 | 0 | 0 | 0 | 0 | 0 | 0 | 0 | 0 | 7.0 | Reno | BCDMH |

NaBr = Sodium Bromide (100%)
NaCl = Sodium Chloride (100%)
CYA = Cyanuric Acid (as Isocyanurate)
Na$_2$Co$_3$ = Sodium Carbonate (100%)
TP = Terpolymer (BF Goodrich BF-K797 Proprietary Terpolymer)
PA = Polyacrylate Homopolymer, M.W, approx. 2,100 (BF Goodrich BF-K759)
DMH = 5,5-Dimethylhydantoin
SiO$_2$ = (as Na$_2$SiO$_3$.5H$_2$O)
MoO$_4^{2-}$ = (as Na$_2$MoO$_4$.2H$_2$O)
PO$_4^{3-}$ = (as Sodium Hexametaphosphate)
PBTA = 2-Phosphonobutane-1,2,4-Tricarboxylic Acid
Phosph. = Phosphonate The corrosion tests were conducted by immersing stainless steel coupons in treated water for 34 days. At the end of a test, the coupon was removed from the water and the extent of corrosion was noted. FIGS. 1-16 provide photographs of selected stainless steel coupons at the end of the corrosion tests.

Figure 7:
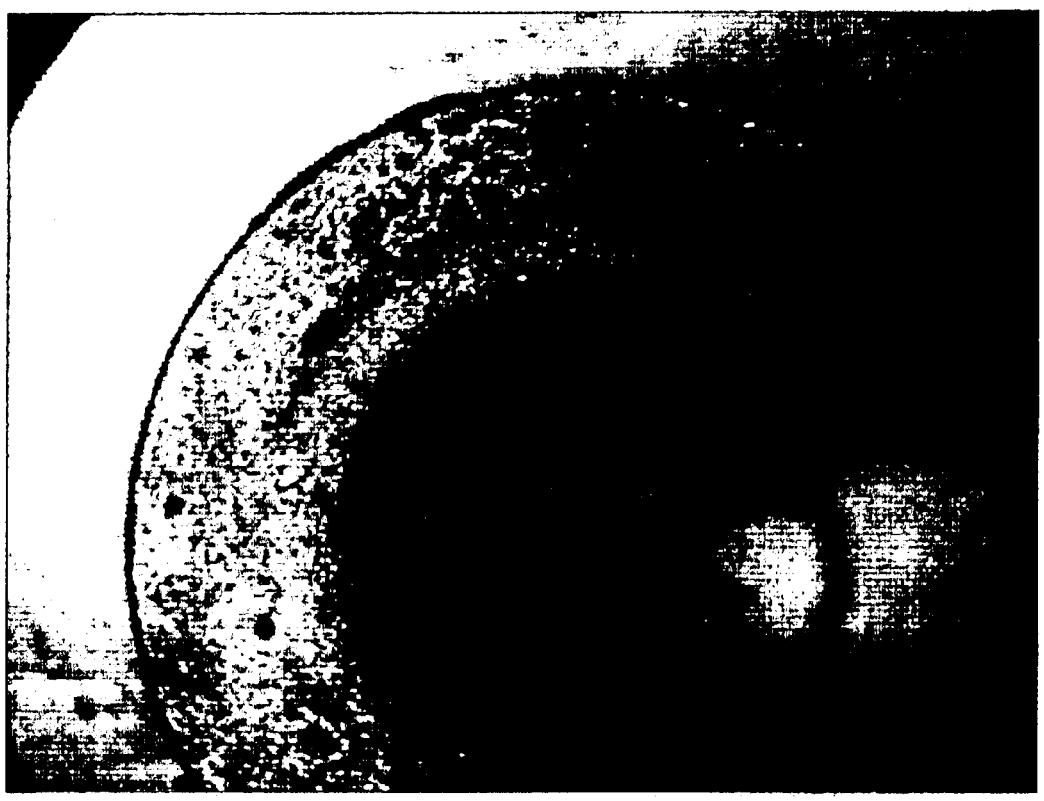
FIG. 7 is a photograph showing corrosion to a coupon after completion of immersion Test G.
Figure 8:
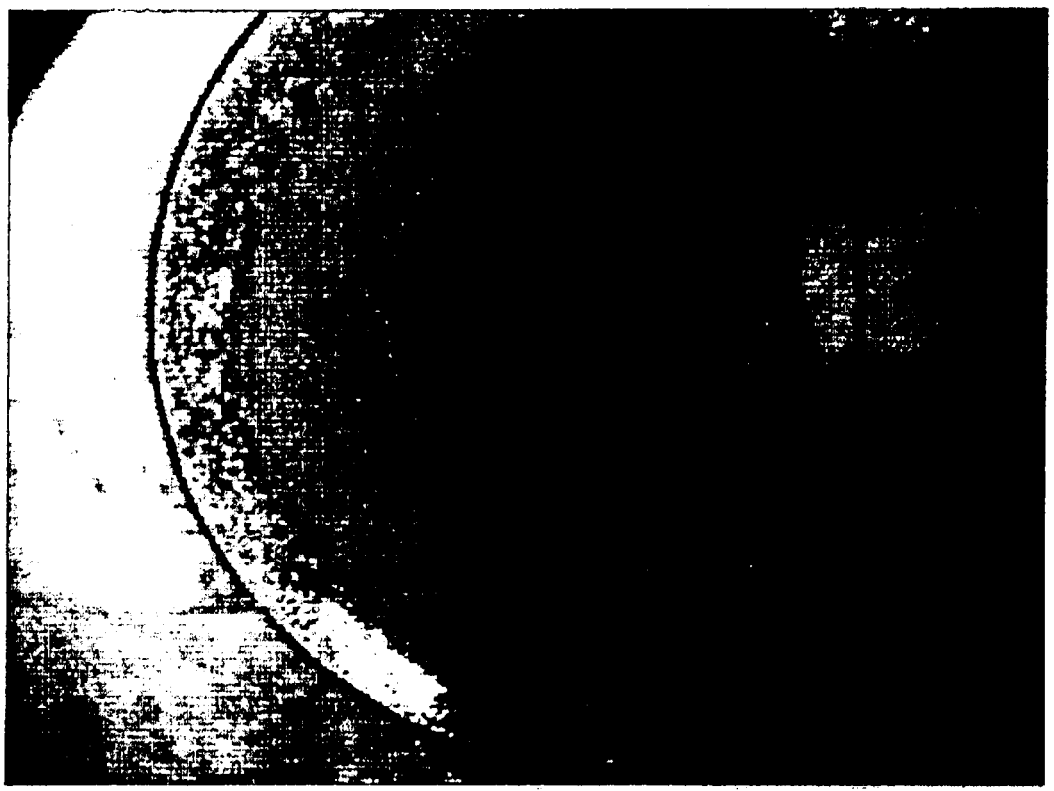
FIG. 8 is a photograph showing corrosion to a coupon after completion of immersion Test H.
Figure 9:
FIG. 9 is a photograph showing corrosion to a coupon after completion of immersion Test I.
Figure 10:
FIG. 10 is a photograph showing corrosion to a coupon after completion of immersion Test K.
Figure 11:
FIG. 11 is a photograph showing corrosion to a coupon after completion of immersion Test L.
Figure 15:
FIG. 15 is a photograph showing corrosion to a coupon after completion of immersion Test P.
Figure 16:
FIG. 16 is a photograph showing corrosion to a coupon after completion of immersion Control Test.

The best overall corrosion results were obtained for formulations containing PBTA (10 ppm, Tests G, H, and I, corrosion test results depicted in FIGS. 7, 8, and 9, respectively), the formulation that contained 300 ppm rather than 600 ppm cyanuric acid (Test L, corrosion test results depicted in FIG. 11), and the formulation containing 20 ppm of phosphonate (Test P, corrosion test results depicted in FIG. 15). Regarding the formulations containing PBTA, the corrosion increased in the following order: Test H<Test G<Test I, with Test I exhibiting the worst corrosion. It is believed that the presence of PO$_4^{3-}$ contributed to the poor results for Test I and that the presence of MoO$_4^{2-}$ contributed to the superior results for Test H. Test H showed less corrosion than Test P, suggesting that PBTA may yield lower corrosion levels than phosphonate. Test H was observed to exhibit less corrosion than Test P. Test H had a higher level of SiO$_2$ than Test P (50 versus 30 ppm). Also, Test H contained PBTA (10 ppm), while Test P contained phosphonate (20 ppm). The data therefore suggest a synergistic effect between PBTA and molybdate or silicate.

It was observed that Test O (corrosion test results depicted in FIG. 14), which contained no corrosion inhibitors but did contain cyanuric acid at a concentration of 600 ppm exhibited significantly lower corrosion than comparative Test N (corrosion test results depicted in FIG. 13) that contained no cyanuric acid. These data suggest a significant anticorrosion effect for cyanuric acid. In terms of general corrosion, Test O provided results similar to those of Test F (corrosion test results depicted in FIG. 6), which contained 50 ppm contains SiO$_2$ and 30 ppm MoO$_4^{2-}$ in addition to the cyanuric acid.

Neither Test O nor Test F contained PBTA.

Figure 12:
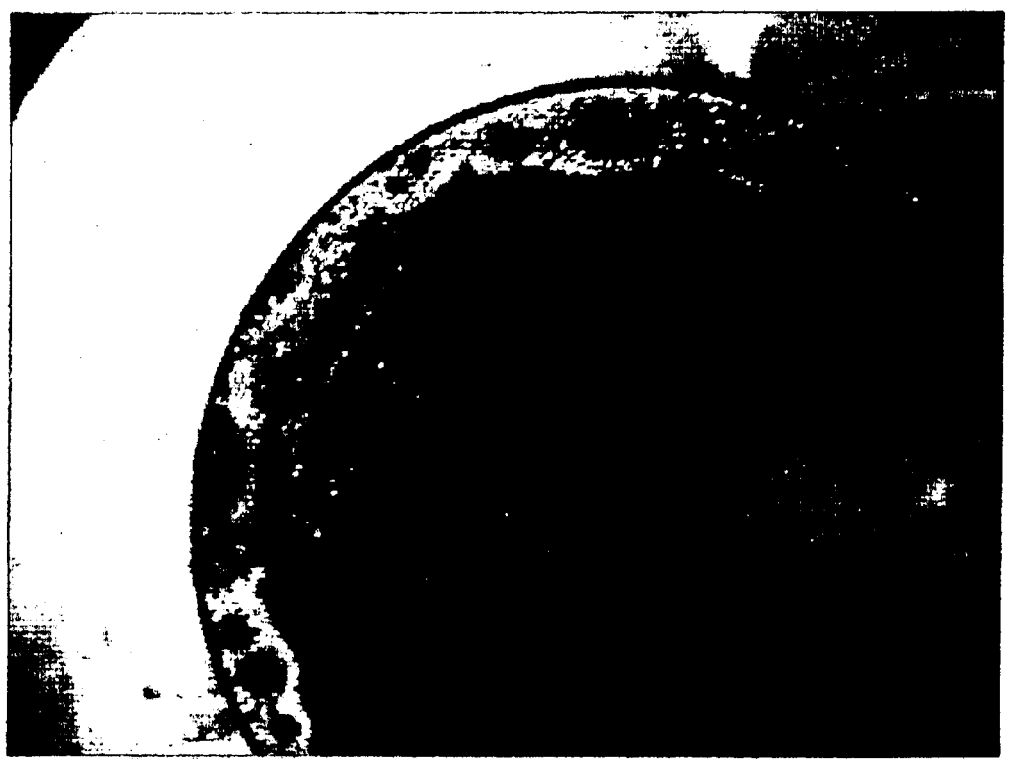
FIG. 12 is a photograph showing corrosion to a coupon after completion of immersion Test M.
Figure 13:
FIG. 13 is a photograph showing corrosion to a coupon after completion of immersion Test N.
Figure 14:
FIG. 14 is a photograph showing corrosion to a coupon after completion of immersion Test O.

A comparison of Tests M and N (1100 ppm vs. 750 ppm NaBr; no cyanuric acid nor other corrosion inhibitors added, corrosion test results depicted in FIGS. 12 and 13, respectively) indicates, as expected, higher corrosion at higher salt levels. Test K (a control test containing 1100 ppm NaCl in which DI-CHLOR was added for sanitizer control, corrosion test results depicted in FIG. 10) showed the worst corrosion even though the test solution contained 100 ppm cyanuric acid. The results shown indicate that less corrosion is observed for 750 ppm sodium bromide than for granular chloride at levels normally observed for tap water. As expected, the test systems that contained no corrosion inhibition compounds and no cyanuric acid buffer (including Tests A, M, N, and the Control, corrosion test results depicted in FIGS. 1, 12, 13, and 16, respectively) exhibited the most pronounced corrosion. Also as expected, the presence of corrosion inhibitors decreased the extent of corrosion, as demonstrated by a comparison of Test C (no corrosion inhibitors, corrosion test results depicted in FIG. 3) and Test D (50 ppm SiO$_2$, 30 ppm MoO$_4^{2-}$, 15 ppm PO$_4^{3-}$, corrosion test results depicted in FIG. 4).

Of the two water sources tested under identical conditions with no corrosion inhibitors added (Test B and Test C), Reno water was observed to produce a slightly more pronounced corrosion than the Kings Beach water. The data suggests that the formulation tested is effective in inhibiting corrosion for water from a variety of sources.

A comparison of Tests D and E, which differ only in the amount of SiO$_2$ added (50 and 12 ppm, respectively) show similar corrosion levels, with arguably lower corrosion levels observed for lower silicate levels. The effect of the PO$_4^{3-}$ addition can be determined by comparing corrosion levels observed for Test D (15 ppm PO$_4^{3-}$) and Test F (0 ppm PO$_4^{3-}$). Surprisingly, more general corrosion occurred in the test that contained phosphate. Some reported "synergies" actually made corrosion worse in the described system. Zinc, for example was one of these. The above description discloses several methods and materials of the present invention. This invention is susceptible to modifications in the methods and materials, as well as alterations in the methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

All references cited above are incorporated herein by reference in their entireties.

What is claimed is:

1. A composition for inhibiting pitting corrosion of a ferrous metal in contact with a metal-corrosive aqueous system, wherein the aqueous system comprises a halogen salt, the composition comprising:
   a) cyanuric acid; and
   b) at least one water-soluble salt selected from the group consisting of alkali metal molybdate salts, alkali metal silicate salts, and mixtures thereof, wherein the weight ratio of cyanuric acid to water soluble salt is from about 1:1 to about 200:1.

2. The composition of claim 1, further comprising a metal-corrosive aqueous system.

3. The composition of claim 1, wherein a concentration of cyanuric acid in the metal-corrosive aqueous system is from about 50 ppm to about 600 ppm.

4. The composition of claim 3, wherein the concentration of cyanuric acid in the metal-corrosive aqueous system is from about 50 ppm to about 300 ppm.

5. The composition of claim 4, wherein the concentration of cyanuric acid in the metal-corrosive aqueous system is about 300 ppm.

6. The composition of claim 1, wherein a concentration of water soluble salt in the metal-corrosive aqueous system is from about 3 ppm to about 50 ppm.

7. The composition of claim 1, wherein the water soluble salt comprises sodium silicate.

8. The composition of claim 7, wherein a concentration of sodium silicate in metal-corrosive aqueous system is from about 3 ppm to about 50 ppm.

9. The composition of claim 8, wherein the concentration of sodium silicate in the metal-corrosive aqueous system is about 11 ppm.

10. The composition of claim 1, wherein the water-soluble salt comprises sodium molybdate.

11. The composition of claim 10, wherein a concentration of sodium molibdate in the metal-corrosive aqueous system is from about 5 ppm to about 50 ppm.

12. The composition of claim 11, wherein the concentration of sodium molybdate in the metal-corrosive aqueous system is about 37 ppm.

13. The composition of claim 1, further comprising:
   c) sodium bromide, wherein the weight ratio of sodium bromide to cyanuric acid is from about 1:2 to about 40:1, and wherein the ratio of sodium bromide to water soluble salt is from about 100:1 to about 60:1.

14. The composition of claim 1, wherein the water soluble salt comprises sodium silicate and sodium molybdate, wherein the weight ratio of cyanuric acid to sodium silicate is from about 1:1 to about 200:1, and wherein the weight ratio of cyanuric acid to sodium molybdate is from about 1:1 to about 200:1.

15. The composition of claim 1, further comprising:
   d) a substance selected from the group consisting of sodium carbonate, polyacrylate homopolymer, and 2-phosphonobutane-1,2,4-tricarboxylic acid.

16. A composition for inhibiting the corrosion of a ferrous metal in contact with a metal-corrosive aqueous system, the composition comprising:
   a) from about 0.02 to about 66 wt. % cyanuric acid;
   b) from about 0.001 to about 13 wt. % sodium molybdate;
   c) from about 0.002 to about 13 wt. % sodium silicate; and
   d) from about 30 to about 97 wt. % sodium bromide.

17. A method for inhibiting the corrosion of a ferrous metal in contact with a metal-corrosive aqueous system, the method comprising the steps of:
   a) adding to the metal corrosive aqueous system from about 50 to about 600 ppm of cyanuric acid; and
   b) adding to the metal corrosive aqueous system from about 3 to about 50 ppm of at least one water-soluble salt selected from the group consisting of alkali metal molybdate salts, alkali metal silicate salts, and mixtures therof.

18. The method claim 17, further comprising the step of:
   c) adding to the metal corrosive aqueous system from about 300 to about 2000 ppm of sodium bromide.

19. The method of claim 17 wherein step b) comprises:
   i) adding to the metal corrosive aqueous system from about 3 to about 50 ppm of sodium molybdate; and
   ii) adding to the metal corrosive aqueous system from about 5 to about 50 ppm of sodium silicate.

20. The method of claim 17 further comprising the step of:
   d) adding to the metal corrosive aqueous system a substance selected from the group consisting of sodium carbonate, polyacrylate homopolymer, and 2-phosphonobutane-1,2,4-tricarboxylic acid.

* * * * *